Dec. 31, 1968  H. H. SEWARD  3,418,962
AUTOMOBILE STOP-START INDICATOR
Filed April 4, 1966
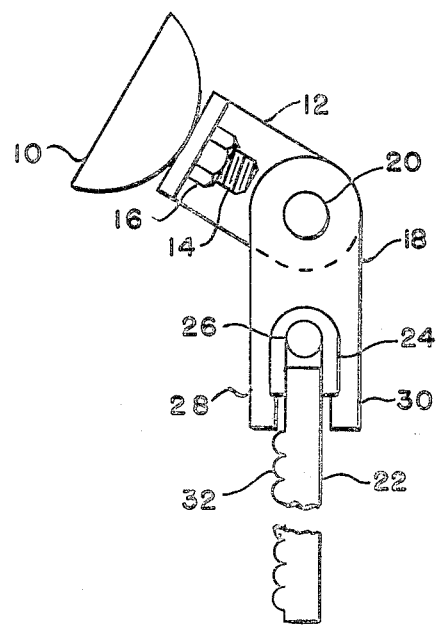
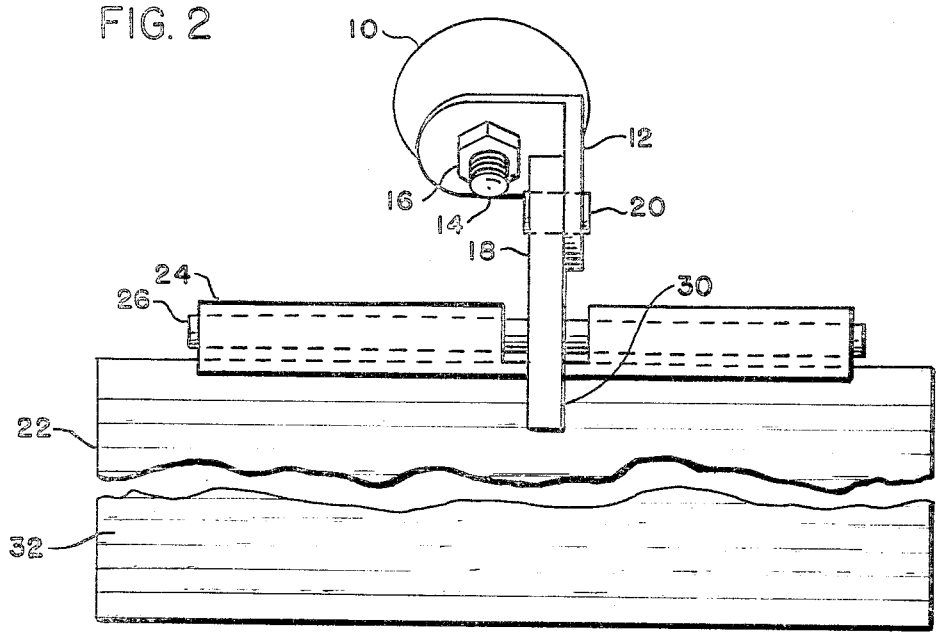
INVENTOR
Harold H. Seward

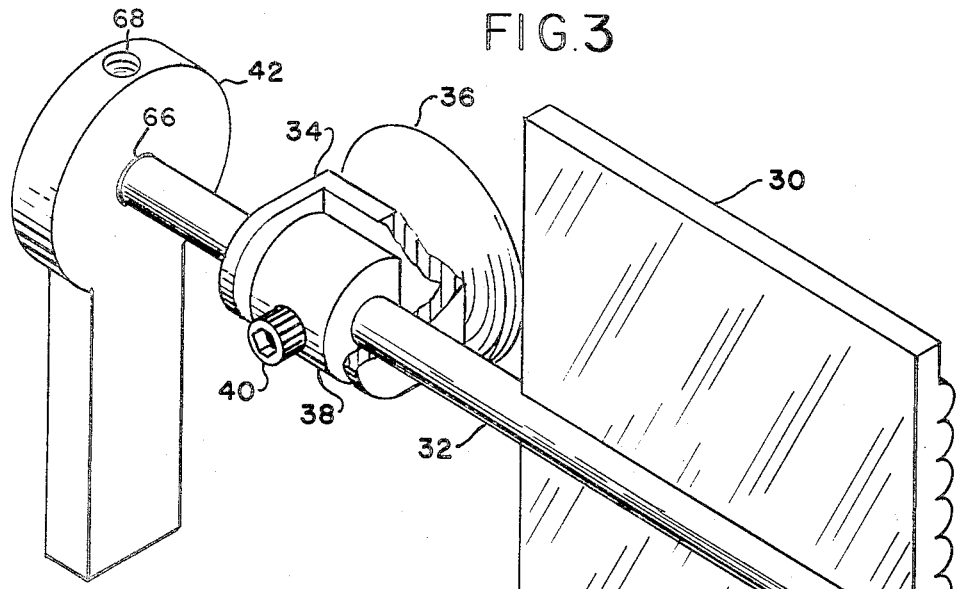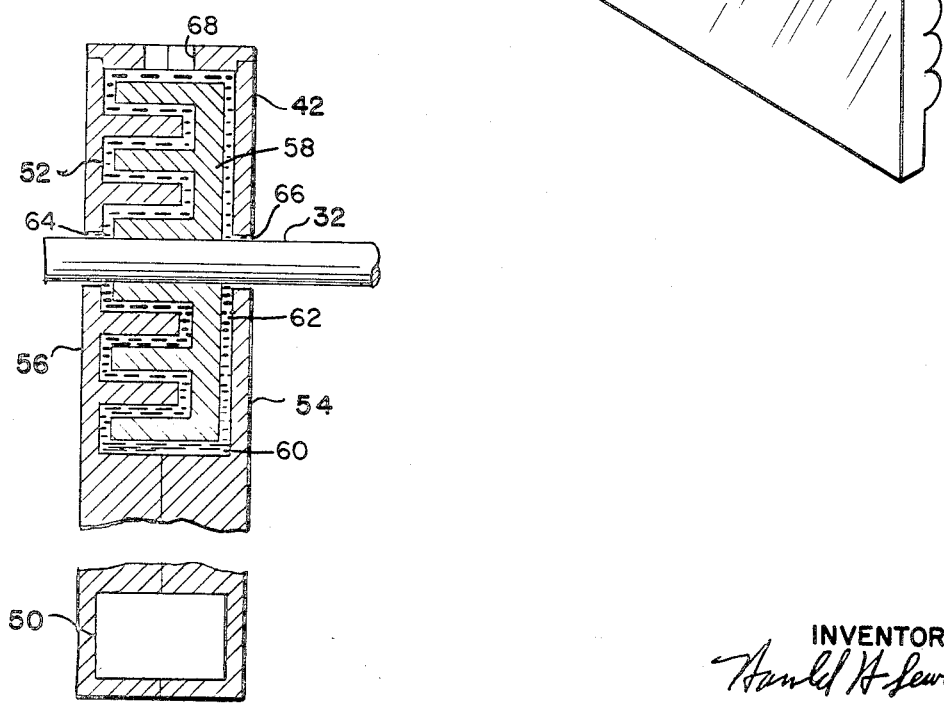

United States Patent Office 3,418,962
Patented Dec. 31, 1968

3,418,962
AUTOMOBILE STOP-START INDICATOR
Harold H. Seward, 16 Frost St., Arlington, Mass. 02174
Filed Apr. 4, 1966, Ser. No. 539,904
7 Claims. (Cl. 116—28)

ABSTRACT OF THE DISCLOSURE

A lenticular-lens changeable picture signal is disclosed which is adapted for attachment to a motor vehicle with a lenticular screen tiltable in response to acceleration forces to present one picture when acceleration is positive, and another picture when acceleration is negative. In the disclosed embodiments tilting is effected by pendulosity of the lenticular screen and associated structure relative to an axis on which the screen is pivotally supported. In one embodiment, an actuating pendulum is viscously coupled to the screen, so that it may follow the vertical on a long incline, while the screen remains properly facing the rear.

---

This invention relates to signs or advertising or other display devices adapted to be carried by moving vehicles. The invention is more particularly applicable to a stop sign adapted to be mounted on the rear of an automobile vehicle to indicate to the driver of a following car that the vehicle is about to stop. More particularly it relates to a simple device adaptable to be attached to the inside rear window of an automobile to provide an auxilliary stop signal. According to the invention the sign is in the form of a transparent viewing screen having a smooth front face and having on its rear face a series of very fine contiguous laterally extending parallel convolutions constituting segments of optical cylinders to define lens elements having on the smooth front face a printed pattern which presents at least two alternate series of space-complemental image dots or parallel lines, each series constituting a disection of a particular scene desired to be presented to a following driver. One series of image lines or dots might represent the word STOP in a red field and is so positioned and optically related with respect to the lens elements of the viewing screen as to be visible to the rear as the screen swings forward upon application of the brakes. Another series which might carry the legend GO on a green field is so positioned as to be visible to the following driver when the screen swings to the rear upon accelaration. In an intermediate position a third series of lines or dots may show orange to the rear. Changeable picture display devices of the kind employed in the present invention are disclosed in Patent No. 1,475,430, granted to J. S. Kirwin on Nov. 27, 1923, and in Patents Nos. 2,799,938 and 2,815,310, granted to V. G. Anderson, Jan. 23 and Dec. 3, 1957, respectively.

An object of the invention is to provide a simple reliable device which provides useful information to a following driver in addition to that supplied by the stop light. It is another object of the invention to provide for the guidance of a following driver an auxiliary signal which is self explanatory. These objects are achieved according to one embodiment of the invention suitable for use in flat country by a simple arrangement for pivoting a lenticular viewing screen about a normally horizontal, transverse axis at the upper edge of the screen whereby the screen swings forward when brakes are applied and swings to the rear when accelerater is depressed. Limit stops suppress ambiguous indications. According to another embodiment of the invention usable on hills a separate pendulous body is used to control the tilting of the screen. Other objects and features of the invention will be apprehended from the following specification and annexed drawings of which:

FIG. 1 is a side elevation of a simple embodiment of the invention.
FIG. 2 is a front elevation of the device of FIG. 1.
FIG. 3 is a prespective view of an embodiment of the invention usable on hills.
FIG. 4 is a section through the pendulum of FIG. 3.

Although the invention is general in application and devices may be adapted for mounting externally on trucks and the like, it is preferred to protect the device from the weather by mounting it within the automobile. In FIG. 1 the rubber suction cup 10 provides a means for attaching the device to the inside of the rear window glass of the automobile. A bracket 12 is attached to the suction cup by a screw 14 and nut 16; a support 18 is pivoted on a fastener 20 to the bracket 12. The screen 22 is carried on a hasp 24 which is pivoted on a pin 26 to the support 18. The screen 22 is thus constrained to pivot about a normally horizontal, transverse axis forward and backward within the automobile. Limit stops 28 and 30 limit the swing of the screen 22. At the time of installation, the support 18 is adjusted on the pivot 20 so that when the car stands level the screen swings evenly between the limit stops. The screen 22 is made of transparent material such as cellulose acetate and has formed on the rear face thereof a series of continuous segments of cylinders defining lens elements 32 extending parallel to the pin 26 which defines the pivot axis of the screen.

Referring now to the embodiment of FIG. 3 the screen 30 is fixed on an axis through its center of gravity to a shaft 32 which is pivoted in a bracket 34 affixed to a suction cup 36. Pivoting of the screen 30 is limited between prescribed angles by a stop 38 carried on the shaft 32 and interferring with the bracket 34 at the prescribed limit angles. The central position of the screen 30 is settable by rotating the stop 38 to a position where it is fixed by a set screw 40. A separate pendulum 42 is carried on the oposite end of the shaft 32, this position being chosen for the pendulum to simplify the design requirements on the bearings for the shaft 32 in the bracket 43. The balanced structure renders it generally sufficient for them to be mere holes 35 through which the shaft 32 passes. The pendulum 42 would be free to rotate on the shaft 32 but for a viscid substance between it and the shaft, resisting such rotation. Thus in steady driving on a level road the screen which is marked with STOP and GO markings as described above will jiggle back and forth between its limits as the pendulum tries to swing forward and backward as the car pitches on its springs. But because of the viscid substance the pendulum cannot swing widely but gradually settles to the vertical position. The spacing of the viscous connection between the pendulum and shaft and the viscosity and quantity of viscid fluid are selected so that the pendulum would settle from a horizontal position to vertical within the accuracy of the limit stops in about 10 seconds time. Thus in steady straight driving whether on the level or on an incline the pendulum in a few seconds reaches a condition wherein the pendulum is vertical and the screen delivers its message to a following motorist whether he be lower or higher than the automobile depending on the incline. It will be seen that in this arrangement as the automobile is traveling normally on the highway the sign will jiggle back and forth between red and green and orange in a more or less random manner. Thus the following driver will have his attention drawn to the device and may deduce its use prior to a brake application at which time he sees a solid red displayed subject to decay as the viscous connection permits the pendulus torque to be relaxed. The appearance of solid green upon acceleration following the stop should complete the necessary learning cycle of a following driver.

FIG. 4 represents a cross section through the pendulum shown in FIG. 3 and illustrates a way in which the viscous connection between shaft and pendulum may be effected. The pendulum has a weight 50 at one end and hollow chamber 52 at the other end. The pendulum body 42 comprises two pieces 54 and 56 which enclose a bushing 58 fixed to the shaft 32 and damping fluid 60. The chamber and the bushing may be of simple cylindrical design or may be finned as shown to increase their surface area. For the viscid damping fluid I prefer a heavy weight silicone oil of the type blended for aircraft service and having a minimum change in velocity between low temperature and high. As a further refinement, changes in the relaxation time of the viscously coupled pendulum may be further minimized by arranging bimetallic parts so that gaps in which the damping fluid operates are restricted in dimensions at higher temperatures and opened up at lower temperatures thereby compensating for the inherent changes in the viscosity of the fluid. More than one fluid may be used as represented by the second, immiscible less dense fluid level 62. The second fluid prevents incursion of heavy fluid into the passages 64 and 66 where its presence would cause highly variable operation. A filler hole 68 may be provided at the top of the pendulum for replenishment of the fluids.

It will be recognized that the pendulum is representative of accelerometers and other specific force-sensitive elements generically known as specific force receivers and the viscous damper is merely representative of rate-sensitive dampers such as dash-pots and eddy-current dampers which are equivalent.

I claim:
1. A vehicle signal device comprising a base member adapted to be mounted on a rear portion of a vehicle, a lenticular lens constituting a changeable-picture display screen, a pivotable support means mounted on said base member and supporting said screen for pivotal movement transverse to the longitudinal axis of said vehicle, means coupled to said screen responsive to acceleration of said vehicle to cause said screen to pivot so that the picture on said screen as viewed by a following motorist changes from a "stop" indication to a "go" indication as the acceleration of said vehicle changes from negative to positive.

2. A signal device as defined by claim 1 wherein said base member comprises a suction cup for mounting said signal device to the rear window of said vehicle.

3. A signal device as defined in claim 1 wherein said last-mentioned means constitutes a pendulous member.

4. A signal device as defined in claim 3 wherein said pendulous member further comprises a damper means.

5. A signal device as defined by claim 2, the edge of said suction cup defining a nominal support plane,
 (a) wherein said support comprises:
  (i) a bracket fixed to said cup and extending outwardly from said support plane,
  (ii) a shaft bushed in said bracket and free to turn therein about an axis substantially parallel to said support plane, and substantially lying in the plane of said screen, said screen being attached to one end of said shaft, and
 (b) wherein said last-named means comprises a pendulum connected to the opposite end of said shaft,
 (c) in further combination with an adjustable stop means carried on said shaft and adjustable to limit the angular rotation of said screen to a small angle about any desired dihedral angle with said support plane, whereby said screen may be maintained substantially perpenducular to the logintudinal axis of said vehicle.

6. A signal device as defined in claim 5 wherein said pendulum comprises a bushing fixed to said shaft, a pendulous body mounted on and rotatable about said bushing, said pendulous body and said bushing forming therebetween a closed passage means, a viscous medium desposed in said passage means thus forming a fluid coupling between said body and said bushing.

7. The signal device as defined by claim 5 including limit stop means fixed to said adjustable means for limiting the pivoting of said screen to avoid ambiguities of message.

References Cited
UNITED STATES PATENTS

| | | | |
|---|---|---|---|
| 1,475,430 | 11/1923 | Curwen | 40—137 |
| 2,219,203 | 10/1940 | Townsend et al. | 248—206 |
| 2,519,222 | 10/1950 | Brooks | 248—206 |
| 2,753,830 | 7/1956 | Pillsburt et al. | 116—37 |
| 2,799,938 | 7/1957 | Anderson | 33—107 |
| 2,880,408 | 3/1959 | Sewell | 116—37 |
| 3,007,435 | 11/1961 | Peterson | 116—28 |
| 3,225,457 | 12/1965 | Schure | 350—167 |
| 3,237,330 | 3/1966 | Dinstbir | 248—206 |

LOUIS J. CAPOZI, Primary Examiner.

U.S. Cl. X.R.

73—521; 40—137; 116—042